United States Patent [19]

Saeda et al.

[11] 3,956,252

[45] May 11, 1976

[54] METHOD FOR PREVENTING FOULING IN THE POLYMERIZATION OF OLEFINS

[75] Inventors: Shigeru Saeda; Yukinori Suzaka, both of Oita, Japan

[73] Assignee: Showa Denku K.K., Tokyo, Japan

[22] Filed: Aug. 4, 1975

[21] Appl. No.: 601,604

[30] Foreign Application Priority Data

Aug. 12, 1974  Japan.................................. 49-91476

[52] U.S. Cl..................................... 526/74; 526/64; 526/339; 526/350; 326/352
[51] Int. Cl.².......................... C08F 2/14; C08F 4/24; C08F 4/60; C08F 10/00
[58] Field of Search ...... 260/93.7, 94.9 B, 94.9 CA, 260/94.9 CB, 94.9 D

[56] References Cited

UNITED STATES PATENTS

| | | | |
|---|---|---|---|
| 3,476,730 | 11/1969 | Streck et al................. | 260/94.9 CA |
| 3,591,572 | 7/1971 | Stamm et al............... | 260/89.5 AW |
| 3,870,690 | 3/1975 | Gordon et al............... | 260/94.9 CA |
| 3,895,000 | 7/1975 | Mathieu....................... | 260/87.1 |

*Primary Examiner*—Alan Holler
*Attorney, Agent, or Firm*—Sherman & Shalloway

[57] ABSTRACT

A method for preventing fouling in the slurry polymerization of olefins in a solvent in the presence of a catalyst, which comprises causing a small amount of a nitrogen-containing salt of phytic acid or a mixture of it with an alkali metal salt of an organic acid to be present as an anti-fouling agent in the polymerization system.

10 Claims, No Drawings

METHOD FOR PREVENTING FOULING IN THE POLYMERIZATION OF OLEFINS

This invention relates to an improved process for polymerizing olefins, and more specifically to a method for preventing fouling that occurs on the inside wall surface of the reactor during the slurry polymerization of olefins in solvent in the presence of a catalyst.

The "fouling", as used herein, denotes the phenomenon that particles of the polymerization product or particles of the solid catalyst in the slurry deposit on the walls of a reactor.

Methods for preparing polyolefins by polymerizing olefins have already been established industrially and have constituted the fundamental sector of the heavy chemical industry. In the past, such methods were directed chiefly to the solution polymerization in which the polymerization is carried out in solution, but in more recent years, have frequently been superseded, for reasons of the cost of production, by a slurry polymerization process in which the polymerization product is suspended in a poor solvent. In the slurry polymerization process, the fouling phenomenon occurs, while it does not in the solution polymerization. Generally, a vessel reactor or pipe loop reactor equipped with a stirrer is used in the slurry polymerization, and in either case, fouling occurs. When fouling occurs, the smoothness of the wall surface of the reactor is lost. Hence, the power for the stirring operation drastically increases, and at the same time, the heat of reaction becomes difficult to remove from the reactor wall. This results in a failure of temperature control, and in the worst case, the reaction runs out of control. Once fouling has proceeded, it is very difficult to remove the deposit during operation, and in many cases, the reactor does not regain its normal state unless cleaned after disassembling.

Generally, the slurry polymerization must be performed at a temperature below the melting point of the polymerization product. When the temperature becomes higher beyond this critical point owing to the occurrence of some trouble, the particles of polymerization product melt and adhere to the reactor wall. Fouling of this type has to do with the phase transfer of the polymer from a solid phase to a liquid phase, and is determined according to the solvent and the molecular weight and comonomer composition of the product. Accordingly, such fouling cannot be prevented to a great extent. However, fouling does occur even when the temperature of the reactor is considerably below the critical point. This phenomenon is more liable to occur with higher slurry concentrations in the reactor, and it becomes difficult to increase the rate of production beyond a certain limit. Furthermore, when the reactor is operated to the verge of the limit, the solid particles deposit on the reactor wall intermittently and locally, and the reactor becomes difficult to operate stably.

Prior art techniques for preventing fouling are few, and we can only cite Japanese Laid-Open Patent Application No. 79289/73. This Application discloses that a mixture of polyvalent metal salts of organic acids consisting mainly of chromium alkylsalicylates is caused to be present in the polymerization system. This technique is effective to some extent, but has the defect that a great amount of the additives is required in order to prevent fouling, and the coloration of the product by the additive and its adverse effects on the polymerization activity of the catalyst cannot be ignored.

Our extensive investigations made in view of the above situation have led to the discovery that in the preparation of polyolefins by the slurry polymerization of olefins in solvent in the presence of a catalyst, the above fouling can be prevented by causing a nitrogen-containing salt of phytic acid or a mixture of it with an alkali metal salt of an organic acid to be present as an anti-fouling agent in the polymerization system. The above compound used in this invention is effective even in very small amounts, and does not adversely affect the polymerization activity of the catalyst. Accordingly, such an anti-fouling agent is especially effective for Phillips-type and Ziegler-type catalysts which are sensitive to catalyst poison.

The invention will be described in greater detail below.

The starting olefins used in this invention are unsaturated aliphatic hydrocarbons containing at least one polymerizable double bond, and are typified by ethylene, propylene, butene-1, 4-methylpentene-1, 1,3-butadiene, and hexene-1. The process of this invention exhibits a superior effect especially in the slurry polymerization of the first four olefins exemplified above. The solvent used in polymer preparation may be nonpolar hydrocarbons which are generally used in slurry polymerization, and examples include liquid aliphatic hydrocarbons such as isobutane, butane, pentane, hexane, heptane, octane or liquid paraffin, aromatic hydrocarbons such as benzene, toluene or xylene, alicyclic hydrocarbons such as cyclohexene, and olefins themselves such as propylene, butene-1 or hexene-1. These solvents are used either alone or in admixtures with each other.

Known slurry polymerization catalysts for olefins can be used as the catalyst. Typical examples are Phillips-type catalysts composed mainly of chromium oxide supported on a carrier comprising at least one of silica, alumina, silica-alumina, zirconia and thoria, Standard-type catalysts composed mainly of molybdenum oxide supported on γ-alumina, catalyst systems consisting of these catalysts and organic metal compounds such as an organoaluminum compound, and Ziegler-type catalysts composed mainly of at least one compound containing a transition metal of groups IV to VI of the periodic table, such as titanium, vanadium, zirconium or chromium and of organometallic compounds containing metals of groups I to III of the periodtic table, when the catalyst is used for polymerizing ethylene with or without other α-olefins.

In the polymerization of propylene alone or with other α-olefins, there can be used Ziegler-Natta catalysts composed of one of titanium trichloride, a titanium trichloride metal halide co-crystallized product and products obtained by modifying these with a modifier such as an alkylene oxide or an organic hydroxyl compound, and an organoaluminum compound, with or without a third component such as various activating agents or stereoregularity-improving agents.

The polymerization conditions may be those generally used in the slurry polymerization of olefins. For example, the temperature is 40° to 120°C., and the pressure is atmospheric pressure to 200 Kg/cm². The polymerization is carried out with or without hydrogen as a chain-transfer agent.

The polymerization reactor is a vessel reactor, a pipe loop reactor or tower reactor, and the polymerization can be performed either continuously or batchwise.

The nitrogen-containing salt of phytic acid used as an anti-fouling agent in this invention is prepared from an organic nitrogen compound containing basic nitrogen and phytic acid. Examples of the organic nitrogen compound are primary amines, secondary amines, tertiary amines, mixtures of these amines, quaternary ammonium compounds, and polymerization products of alkyleneimines.

The amines are expressed by the general formula [$R^1R^2R^3N$] wherein $R^1$, $R^2$ and $R^3$ represent a hydrogen atom or an alkyl, alkenyl, aryl or cycloalkyl group containing 1 to 22 carbon atoms, and preferably at least one of groups $R^1$, $R^2$, and $R^3$ is a substituent containing at least 5 carbon atoms. Examples of these amines are amylamine, hexylamine, octylamine, dodecylamine, eicosylamine, aniline, toluidine, naphthylamine, cyclohexylamine, dihexylamine, dioctylamine, N-ethyl hexylamine, N-methyl octadecylamine, benzylmethylamine, dicyclohexylamine, N,N-dimethyl stearylamine, N,N-dioleylethylamine, N,N-dihexylvinylamine, trihexylamine, tridecylamine, tribenzylamine, N,N-diethylaniline, and N,N-diethylcyclohexylamine.

The quaternary ammonium compounds in which the quaternary ammonium group is expressed by the general formula [$R^4R^5R^6R^7N$]$^+$ wherein $R^4$, $R^5$, $R^6$ and $R^7$ are selected from the group consisting of alkyl groups, alkenyl groups, aryl groups and cycloalkyl groups containing 1 to 22 carbon atoms and preferably at least one of these substituents has at least 5 carbon atoms. Examples of these quaternary ammonium compounds are compounds of tetraamyl ammonium, tetrahexyl ammonium, tetraheptyl ammonium, tetraoctyl ammonium, lauryltrimethyl ammonium, ethyltrihexyl ammonium, cetyltrimethyl ammonium, triethylbenzyl ammonium, trimethylnaphthyl ammonium, trimethylcyclohexyl ammonium, trioctylvinyl ammonium, dimethyldihexyl ammonium, diethyldioctyl ammonium, dipropyldilauryl ammonium, dimethyldioleyl ammonium, dimethyldistearyl ammonium, dimethyldicyclohexyl ammonium, and dimethylbenzylstearyl ammonium.

The polymerized products of alkyleneimines such as ethylenimine, propylenimine and higher homologs thereof may be of straight-chain or branched-chain, or contain a substituent such as an aliphatic or aromatic group in the molecule. There is no particular limit to the degree of polymerization of these polymers, but the degree of polymerization is usually 50 to 500,000, preferably 100 to 300,000. Polyethylenimines and polypropylenimines in which the substituent is an aliphatic group such as hexyl, octyl, lauryl, stearyl or oleyl are especially effective for the object of this invention. Polyethylenimine in which the number of the aliphatic group per monomer unit of the polyethylenimine is 0.05 to 1 is most preferred.

The "phytic acid", as used in the present application, is a generic term for phytic acid itself and its derivatives resulting from the substitution of some of its 12 acidic hydrogen atoms by an alkali metal or alkaline earth metal or a transition metal such as chromium. These metals either occur spontaneously during the production of phytic acid or are added artificially.

The above nitrogen-containing salt of phytic acid can be used alone as an anti-fouling agent. Preferably, it is used as a mixture with an alkali metal salt of an organic acid.

The alkali metal salt of an organic acid is a salt formed between a monovalent alkali metal such as lithium, sodium, potassium, rubidium or cesium and an organic acid selected from organic carboxylic acids, organic sulfonic acids, partial alkyl esters of organic polycarboxylic acids and alkyl esters of organic sulfocarboxylic acids, these acids containing 1 to 30 carbon atoms per molecule. Preferably, the alkyl in the alkyl esters contains 1 to 22 cabon atoms. Preferably, these alkali metal salts of organic acids are soluble in the solvents used in the polymerization of olefins. Examples of preferred alkali metal salts include salts formed between alkali metal salts such as lithium, potassium, sodium, rubidium or cesium, and saturated fatty acids such as capric acid, caprylic acid, lauric acid, myristic acid, palmitic acid, stearic acid and octylic acid, unsaturated fatty acids such as oleic acid, ricinoleic acid and linoleic acid, alicyclic carboxylic acids such as naphthalic acid and cyclohexanecarboxylic acid, carboxylic acids containing an aromatic group such as benzoic acid, p-methylbenzoic acid and hydroxybenzoic acid (salicyclic acid), derivatives of these aromatic carboxylic acids which have an alkyl substituent on the benzene ring, dicarboxylic acids such as sebacic acid and phthalic acid, half esters of dicarboxylic acids such as monoesters of succinic acid, monoesters of glutaric acid, monoesters of adipic acid, monoesters of pimelic acid, monoesters of suberic acid, and monoesters of azelaic acid, saturated aliphatic sulfonic acids such as octanesulfonic acid, nonanesulfonic acid, decanesulfonic acid, undecanesulfonic acid, dodecanesulfonic acid, tridecanesulfonic acid, tetradecanesulfonic acid, pentadecanesulfonic acid, hexadecanesulfonic acid, heptadecanesulfonic acid, octadecanesulfonic acid, nonadecanesulfonic acid, and eicosanesulfonic acid, the corresponding unsaturated aliphatic sulfonic acids, aromatic sulfonic acids such as benzenesulfonic acid and naphthalenesulfonic acid, aromatic sulfonic acids containing a substituent such as alkyl (e.g., p-toluenesulfonic acid and isopropylnaphthalenesulfonic acid), or sulfocarboxylic acid esters such as sulfoacetic acid esters, sulfobenzoic acid esters, sulfosalicylic acid esters, sulfosuccinic acid esters and sulfophthalic acid esters.

In the above mixture, the types of the nitrogen-containing salt of phytic acid and the alkali metal salts of organic acids can be chosen freely. Typical examples of such a mixture are a mixture of a lauryl polyethylenimine salt of phytic acid and a sodium salt of a dioctylsulfosuccinic acid ester, and a mixture of tridimethyldioleyl ammonium phytate and a sodium salt of a dihexylsulfosuccinic acid ester.

The mixing ratio of the phytic acid salt to the alkali metal salt of organic acid is 1 : 0.1 to 1 : 10, preferably 1 : 0.5 to 1 : 2 by weight.

The amount of the anti-fouling agent to be added is 0.001 to 50 g/m$^3$, preferably 0.01 to 5 g/m$^3$, based on the solvent in the polymerization system. These amounts are sufficient to prevent fouling effectively. If the amount is too small, fouling cannot be prevented. On the other hand, when it is added in an excessively large amount, fouling can be prevented but at the same time, the anti-fouling agent adversely affects the polymerization activity of the catalyst.

The anti-fouling agent can be added to the polymerization solvent before the reaction begins, but may also be added during the polymerization. Furthermore, when the olefin monomer to be polymerized is liquid, it can be added to the monomer stock. In still another embodiment, the anti-fouling agent can be added to the solvent together with the catalyst to be used, and this embodiment has the advantage of preventing the agglomerating tendency of the catalyst.

The process of this invention makes it possible to prevent the deposition of polymer particles or solid catalyst particles on the reactor walls in the slurry polymerization of olefins. This, in turn, can result in the reduction of the stirring power increased by the fouling and of the coefficient of thermal conductivity. As a result, the reactor can be safely operated, and its temperature control becomes easy. Hence, products of stable quality can be obtained. Because of the occurrence of fouling in in the reactor, the concentration of the slurry cannot be increased too much in the conventional process, but accoring to this invention, the concentration of the resulting polymer in the slurry can be increased as a result of successful elimination of fouling. Hence, the output in a reactor of the same capacity can be increased. Thus, the present invention is of much commercial significance.

Furthermore, it is surprising that according to the process of this invention, the particle size distribution of the resulting polyolefin is narrower than in the case of not using the anti-fouling agent, and therefore that the resulting polymer can be easily fed into an extruder and the surging does not occur. Furthermore, when the polyolefin is formed into films, the occurrence of fish eyes is reduced, and in high density polyethylene, environmental stress cracking resistance (ESCR) is increased.

It has not been entirely clear why these effects are brought about by the addition of the phytic acid salt. However, it is presumed that the phytic acid is adsorbed to the surface of the solid catalyst, and the catalyst and the phytic acid salt form a kind of catalyst complex. This appears to better the affinity between the catalyst and the solvent, and permit the solvent to come in between the catalyst particles. Because of this, the mutual adhesion of the catalyst particles would be prevented, and the affinity between metal or glass and the catalyst would be weakened to reduce the deposition of the catalyst particles on the reaction wall.

The following Examples and Comparative Examples illustrate the present invention in greater detail.

EXAMPLE 1

In a 320-liter loop reactor, ethylene was polymerized continuously using n-pentane as a solvent and a chromium oxide-silica-alumina catalyst prepared by depositing 2% by weight of chromium oxide on a silica-alumina carrier and activating the resulting product in air at 800°C. for 10 hours.

The reaction pressure was 40 Kg/cm$^2$, and the reaction temperature was 95°C. The amount of the catalyst was 4.83 g/hour. A mixture consisting of 75 parts by weight of a sodium salt of a dioctylsulfosuccinic acid ester and 25 parts by weight of a 1 : 3 (by weight) reaction product derived from phytic acid and an alkyl polyethylenimine containing one-half lauryl group per monomer unit and having a molecular weight of 10 millions (the mixture will be referred to as additive A) was continuously fed into the reactor so that the concentration of the additive A became 2 g/m$^3$ based on the polymerization solvent.

When the slurry concentration was 35%, the power of the circulating pump was 6.5 KW. The overall heat transfer coefficient of the reactor wall was 1040 Kcal/m$^2$.hr.°C.

The polymerization productivity was 5100 g/g of catalyst, and did not change from the case of not adding the additive A.

The operation of the polymerization reactor was very stable, and the control of the reaction temperature was easy. Without any troubles during the continuous operation for 5 days, polyethylene could be produced at a rate of 32 Kg/hour.

COMPARATIVE EXAMPLE 1

Ethylene was polymerized under the same reaction conditions as in Example 1 using the same reactor and same catalyst as used in Example 1 except that the additive A was not added. When the slurry concentration was 35%, the power of the circulating pump was 9.0 KW, and the overall heat transfer coefficient was 800 Kcal/m$^2$.hr.°C. These results were very inferior to those obtained in Example 1.

The operation was unstable, and in order to perform the continuous operation, the slurry concentration had to be decreased by several percent.

EXAMPLES 2 to 5

Ethylene was polymerized continuously under the same conditions as in Example 1 using the same reactor and catalyst as in Example 1 except that the concentration of the additive A was changed as shown in Table 1. The results are shown in Table 1.

Table 1

| Examples | 2 | 3 | 4 | 5 |
|---|---|---|---|---|
| Concentration of the additive A (g/m$^3$) | 0.005 | 0.5 | 5 | 20 |
| Polymerization temperature (°C.) | 95 | 95 | 95 | 95 |
| Polymerization pressure (Kg/cm$^2$) | 40 | 40 | 40 | 40 |
| Slurry concentration (%) | 35 | 35 | 35 | 35 |
| Power of circulating pump (KW) | 8.8 | 6.4 | 6.5 | 6.4 |
| Overall heat transfer coefficient (Kcal/m$^2$.hr.°C.) | 820 | 1060 | 1020 | 1040 |

Table 1-continued

| Examples | 2 | 3 | 4 | 5 |
|---|---|---|---|---|
| Polymerization activity (g/g of catalyst) | 5150 | 5020 | 4900 | 3570 |

EXAMPLE 6

Ethylene was polymerized continuously under the same conditions as in Example 1 using the same reactor and catalyst as in Example 1. A 1:3 (by weight) reaction product of phytic acid and an alkyl polyethylenimine containing one-half lauryl group per monomer unit was continuously poured into the reactor in an amount of 5 g/m$^3$ based on the polymerization solvent.

When the slurry concentration was 35%, the power of the circulating pump was 6.5 KW, and the overall heat transfer coefficient was 1030 Kcal/m$^2$.hr.°C. Polyethylene could be produced stably.

EXAMPLE 7

Ethylene was continuously polymerized under the same conditions as in Example 1 using the same reactor and catalyst as in Example 1. Tridimethyldiolyl ammonium phytate was poured continuously into the reactor in an amount of 10 g/m$^2$ based on the polymerization solvent. When the slurry concentration was 35%, the power of the circulating pump was 6.4 KW, and the overall heat transfer coefficient was 1020 Kcal/m$^2$.hr.°C. The operation could be performed stably and continuously.

EXAMPLE 8

Propylene was polymerized in bulk continuously using the same reactor as in Example 1, and 51.4 g/hour of AA-type titanium trichloride as a catalyst and liquid propylene monomer as a solvent. At the same time, 500 mole ppm of ethylaluminum dichloride, 325 mole ppm of hexamethylphosphoric triamide and 400 mole ppm of hydrogen, all amounts based on the liquid propylene, were added.

The additive A used in Example 1 was poured continuously into the reactor in an amount of 2 g/m$^3$ based on the liquid propylene. The polymerization temperature was 70°C. and the polymerization pressure was 45 Kg/cm$^2$. The slurry concentration was maintained at 30%.

During the continuous operation for 3 days, polypropylene could be produced very stably. The output could be maintained at 27 Kg/hour. During this time, the power of the circulating pump was 7.8 KW, and the overall heat transfer coefficient was 920 Kcal/m$^2$.hr.°C. The polymerization activity was 480 g/g.hr.

COMPARATIVE EXAMPLE 2

Propylene was polymerized under the same conditions as in Example 8 except that the additive A was not added. When the operation was performed while keeping the slurry concentration at 30%, the power of the circulating pump increased to 9.5 KW, and the overall heat transfer coefficient decreased to 720 Kcal/m$^2$.hr.°C. At the same time, the operation became unstable, and was not stabilized unless the slurry concentration was decreased somewhat.

EXAMPLE 9

Propylene was polymerized under the same conditions as in Example 8 using the same loop reactor as in Example 1 and the same catalyst as used in Example 8 except that 10 g/m$^3$ of a 1:1 mixture of tridimethyl dilauryl ammonium phytate and sodium isoamylnaphthalenesulfonate was used instead of the additive A.

The power of the circulating pump was 8.7 KW, and the overall heat transfer coefficient was 880 Kcal/m$^2$.hr.°C. The polymerization activity was 470 g/g.hr.

EXAMPLE 10

Propylene was polymerized in bulk in the same way as in Example 9 except that a 1:1 mixture of stearyl polyethylenimine salt of phytic acid and sodium octadecylbenzoate was used in an amount of 10 g/m$^3$ as the additive. The power of the circulating pump was 8.8 KW, and the overall heat transfer coefficient was 770 Kcal/m$^2$.hr.°C.

EXAMPLE 11 and COMPARATIVE EXAMPLE 3

Ethylene was polymerized in a 320-liter loop reactor using the same catalyst as in Example 1. 100 liters of n-pentane was added to 4 Kg of the catalyst, and the same additive as used in Example 1 was added in an amount of 2 g. With stirring, the catalyst slurry was fed into a reactor by means of a plunger pump. Even after continuous operation for 10 days, the catalyst did not deposit in pipes between the catalyst tank and the pump and also between the pump and the reactor. Thus, the catalyst could be fed at a constant rate.

The polymerization was performed using n-pentane as a solvent at a temperature of 95°C. and a pressure of 35 Kg/cm$^2$. A white powder having a melt index of 0.8 g/10 minutes was obtained at a rate of 25 Kg per hour. The resulting product was designated as Sample A (Example 11).

For example, the above procedure was repeated except that the additive was not added to the catalyst. It was found that the feeding of the catalyst began to be unstable on the third day, and the output had to be decreased to 18 Kg/cm$^2$ per hour. The polymerization was stopped, and the catalyst feeding lines were disassembled. It was found that a large amount of the catalyst deposited in the pipe between the pump and the reactor. White powdery polyethylene having a melt index of 0.7 g/10 minutes was obtained. The product was designated as sample B (Comparative Example 3).

The particle size distribution of each of the samples A and B was measured. As shown in Table 2, the sample A had a narrower particle size distribution.

Table 2

| Particle size (Tyler mesh) | Sample A (wt.%) | Sample B (wt.%) |
|---|---|---|
| 0 – 10 | 0.8 | 0.8 |
| 10 – 14 | 4.0 | 6.3 |
| 14 – 24 | 44.5 | 40.5 |
| 24 – 32 | 40.3 | 32.0 |
| 32 – 42 | 5.5 | 11.8 |

Table 2-continued

| Particle size (Tyler mesh) | Sample A (wt.%) | Sample B (wt.%) |
|---|---|---|
| 42 – 60 | 3.1 | 4.4 |
| 60 – 100 | 1.0 | 2.0 |
| 100–PAN | 0.8 | 2.2 |

To each of samples A and B were added 0.03 PHR of di-t-butyl p-cresol (BHT for short), 0.04 PHR of distearyl thiodipropionate (DSTDP for short) and 0.1 PHR of calcium stearate, and each of the mixtures obtained was pelletized by means of an extruder with a screw diameter of 30 mm. At this time, the sample A exhibited better trapping.

The environmental stress cracking resistance (ESCR) of the pellets was measured in accordance with the method of ASTM-D 1693-70. In a 100% non-ionic surfactant (NONION NS 210-T; trademark for a product of Nippon Oils and Fats Co., Ltd.) at 50°C., the sample A had an $F_{50}$ of 35 hours, and the sample B had an $F_{50}$ of 15 hours. Thus, the sample A was found to have better ESCR.

Each of the samples A and B was further formed into a film having a thickness of 30 microns by means of an inflation-molding machine with a die of 40 mm diameter. The number of fish eyes in the resulting films was determined to be 8/cm³ for the sample A, and 18/cm³ for the sample B.

EXAMPLE 12

Ethylene was polymerized in the presence of hydrogen at a temperature of 85°C. and a total pressure of 50 Kg/cm² using hexane as a solvent in the same reactor as used in Example 1. Commercially available AA-type titanium trichloride and triisobutyl aluminum were used as a catalyst. While adjusting the concentration of triisobutyl aluminum at 1 millimole/liter solvent, in the presence of hydrogen as a transfer agent, and continuously adding the titanium trichloride so that the slurry concentration in the polymerization system became 35%, the polymerization was performed continuously.

The additive A used in Example 1 was continuously poured into the polymerization system so as to maintain its concentration at 2 g/m³. During the continuous operation for 3 days, the power of the circulating pump of the reactor was stable at 6.2 KW, and the overall heat transfer coefficient of the reactor wall was 1080 Kcal/m².hr.°C. Thus, without suffering from fouling, polyethylene could be continuously produced at a rate of 29 Kg/hour.

COMPARATIVE EXAMPLE 4

Ethylene was continuously polymerized in the same way as in Example 12 except that the additive A was not added. After the starting of the polymerization, the polymer slurry concentration was increased gradually. When the slurry concentration became about 30%, the polymerization began to be unstable. When the slurry concentration increased to 35%, the power of the circulating pump was 7.8 KW, and the overall heat transfer coefficient gradually decreased to 750 Kcal/m².hr.°C. It was difficult to cool the reaction system, and there was a danger of the reaction running out of control. Hence, the experiment had to be stopped.

EXAMPLES 13 to 18

Ethylene was continuously polymerized in the presence of hydrogen at a temperature of 85°C. and a total pressure of 50 Kg/cm² using the same reactor as in Example 1 and the same catalyst and solvent as in Example 12 in the presence of each of the additives shown in Table 3 below. In any case, continuous operation could be performed stably.

The additive consisted of 50 parts of lauryl polyethylenimine salt of phytic acid and 50 parts of each of the alkali salts of organic acids shown in Table 3.

The results are shown in Table 3.

Table 3

| Examples | 1 | 2 | 3 | 4 | 5 | 6 |
|---|---|---|---|---|---|---|
| Additive (50 parts of lauryl polyethylenimine salt of phytic acid and 50 parts of each of the alkali salts of organic acid shown) | Potassium p-toluene-sulfonate | Potassium octane-sulfonate | Amyl sodium sulfosuccinate | Lithium oleate | Sodium diisopropyl salicylate | Potassium phthalate |
| Concentration of the additive (g/m³) | 20 | 20 | 5 | 30 | 20 | 25 |
| Polymerization temperature (°C.) | 85 | 85 | 85 | 85 | 85 | 85 |
| Polymerization pressure (kg/cm²) | 50 | 50 | 50 | 50 | 50 | 50 |
| Power of circulating pump (KW) | 6.1 | 6.2 | 6.1 | 6.1 | 6.0 | 6.1 |
| Overall heat transfer coefficient (Kcal/m².hr.°C.) | 1030 | 1040 | 1080 | 1060 | 1050 | 1080 |
| Fouling | None | None | None | None | None | None |

EXAMPLE 19

Ethylene was polymerized continuously under the same polymerization conditions as in Example 1 using the same reactor and catalyst as in Example 1

A mixture consisting of 50 parts of a sodium salt of a dioctylsulfosuccinic acid and 50 parts of a salt formed between phytic acid and an alkylpolyethylenimine having a molecular weight of 10 millions and one-half octyl group per monomer unit was continuously poured into the reactor in an amount of 2 g/m³ based on n-pentane as a polymerization solvent.

When the polymer concentration in the slurry was 35%, the power of the circulating pump was 6.3 KW, and the overall heat transfer coefficient was 1080 Kcal/m².hr.°C. During the continuous operation for 3 days, no fouling occurred.

EXAMPLES 20 to 23

Ethylene was polymerized continuously in the presence of hydrogen at a polymerization temperature of 85°C. and a total pressure of 50 Kg/cm² using the same reactor as in Example 1 and the same catalyst and solvent as in Example 12, in the presence of each of the additives indicated in Table 4.

Table 4

| Examples | 20 | 21 | 22 | 23 |
|---|---|---|---|---|
| Additive (50 parts of sodium salt of dioctylsulfosuccinic acid and 50 parts of each of the phytic acid salts indicated) | Stearyl polyethylenimine salt of phytic acid | Lauryl polypropylenimine salt of phytic acid | Tetra(stearyl amine) salt of phytic acid | Ethyldioleyl amine salt of phytic acid |
| Concentration of the additive (g/m³) | 2 | 5 | 30 | 20 |
| Polymerization temperature (°C.) | 85 | 85 | 85 | 85 |
| Polymerization pressure (Kg/cm²) | 50 | 50 | 50 | 50 |
| Power of circulating pump (KW) | 6.1 | 6.5 | 6.3 | 6.0 |
| Overall heat transfer coefficient (Kcal/m².hr.°C.) | 1030 | 1060 | 1050 | 1030 |
| Fouling | None | None | None | None |

What we claim is:

1. In the slurry polymerization of olefins in a solvent in the presence of a catalyst, a method for preventing the catalyst particles and the resulting polymer particles from depositing on the inner wall surface of a polymerization reactor which comprises causing a small amount of an anti-fouling agent to be present in the reaction system, the anti-fouling agent being either (a) at least one basic nitrogen-containing salt of phytic acid, or (b) a mixture of said phytic acid salt and at least one alkali metal salt of an organic acid selected from the group consisting of organic carboxylic acids, organic sulfonic acids, partial alkyl esters of organic polycarboxylic acids and alkyl esters of organic sulfocarboxylic acids, said organic acids containing 1 to 30 carbon atoms per molecule, said alkyl in the alkyl esters containing 1 to 22 carbon atoms and said alkali metal salt being soluble in the solvent.

2. The method of claim 1 wherein the amount of said anti-fouling agent is 0.001 to 50 g per cubic meter of the solvent.

3. The method of claim 1 wherein the amount of said anti-fouling agent is 0.01 to 5 g per cubic meter of the solvent.

4. The method of claim 1 wherein in the mixture of the phytic acid salt and the alkali metal salt of organic acid, the weight ratio of the former to the latter is 1:0.1 to 1:10.

5. The method of claim 4 wherein the weight ratio of the phytic acid salt to the alkali metal salt of organic acid is 1:0.5 to 1:2.

6. The method of claim 1 wherein said basic nitrogen-containing salt of phytic acid is an amine salt, a quaternary ammonium salt or a polyalkylenimine salt of phytic acid, said amine, quaternary ammonium or polyalkylenimine group being substituted by at least one alkyl or aryl group containing 1 to 22 carbon atoms.

7. The method of claim 1 wherein said basic nitrogen-containing salt of phytic acid is a lauryl polyethylenimine salt of phytic acid.

8. The method of claim 1 wherein said alkali metal salt of organic acid is a sodium salt of a dialkyl ester of sulfosuccinic acid.

9. The method of claim 1 wherein said olefin is ethylene, said catalyst is a chromium oxide catalyst, and the slurry polymerization is carried out in a liquid hydrocarbon.

10. The method of claim 1 wherein said olefin is propylene, said catalyst is a Ziegler-Natta catalyst, and the slurry polymerization is carried out in liquid propylene.

* * * * *

UNITED STATES PATENT AND TRADEMARK OFFICE
CERTIFICATE OF CORRECTION

PATENT NO. : 3,956,252
DATED : May 11, 1976
INVENTOR(S) : Shigeru Safda et al.

It is certified that error appears in the above—identified patent and that said Letters Patent are hereby corrected as shown below:

Item 73, line 1, delete "Denku", insert -- Denko --

Signed and Sealed this

Third Day of August 1976

[SEAL]

Attest:

RUTH C. MASON
Attesting Officer

C. MARSHALL DANN
Commissioner of Patents and Trademarks